March 6, 1962 L. E. JANSSON 3,024,422

CIRCUIT ARRANGEMENT EMPLOYING TRANSISTORS

Filed July 1, 1958 3 Sheets-Sheet 1

INVENTOR.
LEONARD ERIC JANSSON
BY
[signature]
AGENT

CIRCUIT ARRANGEMENT EMPLOYING TRANSISTORS

Filed July 1, 1958 3 Sheets-Sheet 2

INVENTOR.
LEONARD ERIC JANSSON
BY [signature]
AGENT

March 6, 1962 L. E. JANSSON 3,024,422

CIRCUIT ARRANGEMENT EMPLOYING TRANSISTORS

Filed July 1, 1958 3 Sheets-Sheet 3

INVENTOR.
LEONARD ERIC JANSSON
BY
Frank R. Jifani
AGENT

United States Patent Office 3,024,422

Patented Mar. 6, 1962

3,024,422

CIRCUIT ARRANGEMENT EMPLOYING TRANSISTORS

Leonard Eric Jansson, Southampton, England, assignor to North American Philips Company, Inc., New York, N.Y.

Filed July 1, 1958, Ser. No. 746,031
Claims priority, application Great Britain Aug. 2, 1957
2 Claims. (Cl. 330—18)

This invention relates to circuit arrangements comprising a plurality of transistors which are connected in series with a load to a supply source, which series-combination includes a first transistor to the emitter-base path of which an input signal is supplied.

In many applications where relatively high signal voltages are required, such as in the operation of cathode-ray tubes, the voltage limitations of existing transistors prevent their use in conventional circuits. This is especially true in the case of so-called high frequency transistors. Obviously where a single transistor cannot be operated at a required voltage without breakdown occurring, the use of a plurality of transistors effectively in series with respect to this voltage will provide a solution, but it is important that each transistor should carry a proper proportion of the voltage in question. It is also important that this proportion should hold not only for D.C. but for A.C. (signal) voltages.

It is the principal object of the present invention to solve the difficulty of maintaining such proper proportioning.

According to the invention a potentiometer is connected effectively in parallel with the series-connected transistors, tappings on the said potentiometer being connected to the bases of all but the first transistor so that, irrespective of the input signal, the emitter-collector potential difference of each transistor so controlled cannot exceed a predetermined part of the supply voltage.

With a plurality of auxiliary transistors, the base tappings are distributed along the potentiometer means in the same order as the respective auxiliary transistors. If all the auxiliary transistors have the same ratings and the tappings are evenly spaced, then, neglecting the effect of base currents on the potentiometer means, substantially the same potential difference will be applied in operation between the emitter and collector electrodes of each auxiliary transistor. This function can be performed by the potentiometer means even with a relatively simple circuit in which the only connections between the auxiliary transistors and the potentiometer means are the connections between the base electrodes and the tappings. However, such an arrangement requires an end section of the potentiometer means to carry a current component equal to the sum of the base currents of all the auxiliary transistors, and consequently the equal voltage distribution would not be maintained at all currents. This can be avoided by providing additional connections between the emitters of the auxiliary transistors and the potentiometer means; thus a redistribution of current takes place at these connections so that the currents are the same in sections at both ends of the potentiometer system. In such an arrangement each auxiliary transistor behaves as an emitter-follower (in a manner analogous to a cathode-follower) whereby the emitter potential closely follows the base potential; since the individual base electrodes of the auxiliary transistors are maintained substantially at potentials which are predetermined fractions of the total potential difference appearing across the series combination of emitter-collector paths as a whole, the emitter potentials follow likewise to give the required effect. Meanwhile it may be observed that the emitter-follower action cannot take place with a plurality of auxiliary transistors having both their base electrodes and their emitters connected to the same potentiometer, and therefore the potentiometer means will be described, in the relevant example, as comprising a plurality of potentiometers to avoid this difficulty, such potentiometers being interleaved in such manner that each extends across the emitter-collector paths of two adjacent auxiliary transistors while providing a single base connection.

The primary transistor may be located at the end of the series combination remote from the load impedance, in which case it may be connected in a grounded base circuit or in a grounded emitter circuit. Alternatively, the primary transistor may be connected adjacent the load in a circuit of the "boot-strap" type.

Arrangements according to the invention may be employed for A.C. signal amplification or for D.C. amplification. The input means may comprise leads or terminals for connection to a signal source, or the input means may comprise an input coupling transformer; on the other hand, the input means may include an actual source of signals which are required to be amplified.

Circuits according to the invention may employ junction transistors, or other types of transistors such as point-contact transistors or field effect transistors.

Specific embodiments of the invention employing junction transistors will now be described by way of example with reference to the accompanying diagrammatic drawings.

Figures 1, 2, 3:
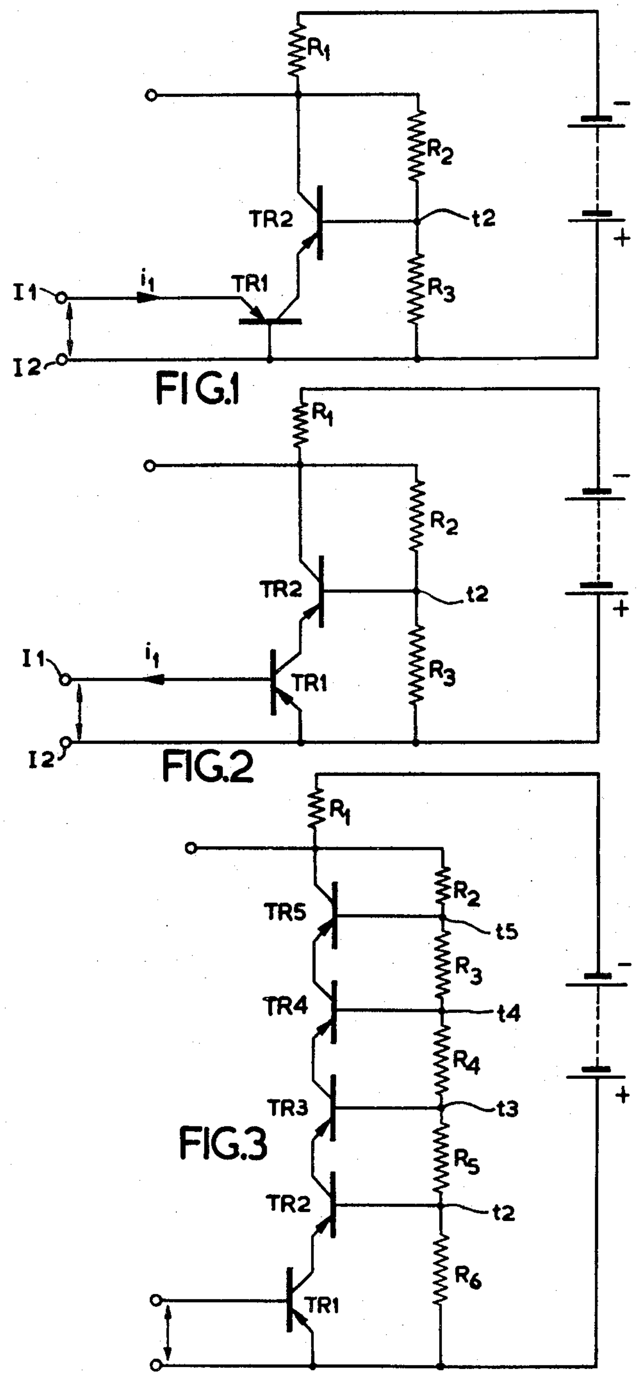
FIGURE 1 is a circuit diagram of a simple circuit employing a primary transistor in grounded base circuit and one auxiliary transistor.
FIGURE 2 is a similar circuit wherein the primary transistor is connected in a grounded emitter circuit.
FIGURES 3 and 4 are arrangements employing a primary transistor together with four auxiliary transistors.

Referring now to the drawings, and more particularly to FIGURE 1, $R_1$ is a load connected in series with the series combination of the emitter-collector paths of a primary transistor TR1 and an auxiliary transistor TR2. The transistors are p-n-p junction transistors, and the primary transistor TR1 is arranged in grounded base configuration.

The potentiometer means comprise resistances $R_2$ and $R_3$ and said means are connected effectively in parallel with the series combination of emitter-collector paths, the auxiliary transistor having a connection from its base to an individual tapping *t2* on said potentiometer means; the potentiometr means $R_2$—$R_3$ are so connected to said series combination as to be adapted to maintain the potential difference across the emitter-collector path of the auxiliary transistor at a value which is about one half of any potential difference appearing across the said series combination. $R_2$ and $R_3$ form a potential divider holding the base of the transistor TR2 at a potential substantially half-way between that of TR2 collector and ground. The total voltage that may be allowed across the two transistors is therefore equal to approximately twice the voltage permissible across one transistor.

In a typical case the transistor base current may equal, say, 1% of its emitter current, so that if the current in the potential divider $R_2$ and $R_3$ is made equal to, say, 10% of the emitter current, the base potential of TR2 will not be seriously affected by base current flowing in $R_2$ and $R_3$. If $R_2$ and $R_3$ are equal resistances the base-to-collector voltage will be approximately the same for both transistors.

The input means comprise terminals $I_1$, $I_2$ for connection to a signal source. As the input current $i_1$ is varied the voltage drop across $R_1$ varies, so varying the total voltage existing across the two transistors but since the base of TR2 is held approximately half-way between TR2 collector potential and ground the voltages across the two transistors are approximately equal irrespective of the value of $i_1$.

The circuit of FIGURE 2 differs from the circuit of FIGURE 1 in that the primary transistor TR1 is arranged in ground emitter configuration. A resistance can be included in series with TR1 emitter for the purpose of stabilizing the D.C. working point or improving the amplifier frequency response in accordance with normal practice.

The circuit of FIGURE 3 employs a primary transistor TR1 and four auxiliary transistors TR2–TR5 in a relatively simple circuit in which the only connections between the auxiliary transistors and the potentiometer means are the connections between the base electrodes and the tappings *t2*–*t5*. If all the auxiliary transistors have the same ratings and the tappings are evenly spaced, then, neglecting the effect of base currents on the potentiometer means, substantially the same potential difference will be applied in operation between the emitter and collector electrodes of each auxiliary transistor. However, this arrangement requires the end section $R_2$ of the potentiometer means to carry a current component equal to the sum of the base currents of all the auxiliary transistors, and consequently the equal voltage distribution would not be maintained at all currents. This can be avoided, as aforementioned, by providing additional connections between the emitters of the auxiliary transistors and the potentiometer means so as to obtain a circuit arrangement in which each auxiliary transistor behaves as an emitter-follower. An example of such a circuit arrangement is given in FIGURE 4.

Figure 4:
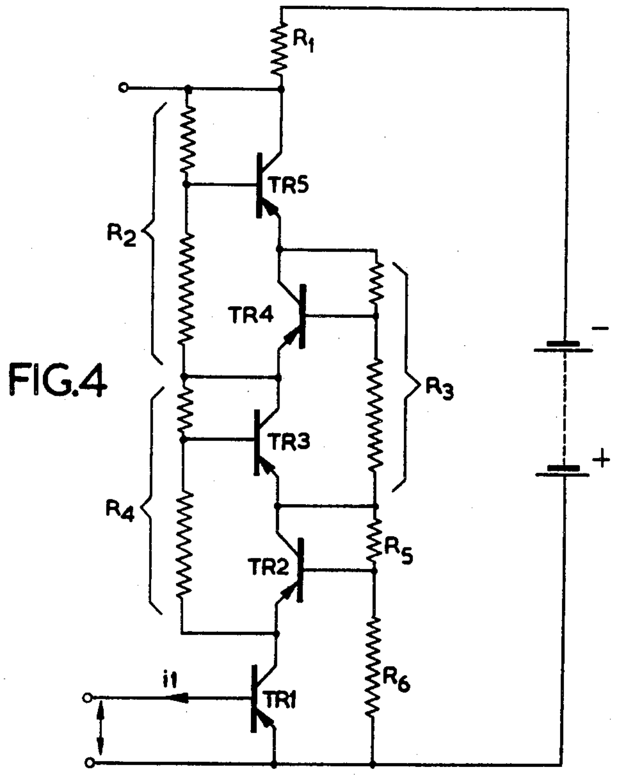

Referring to FIGURE 4, the primary transistor TR1 is in grounded emitter configuration and is shown in series with four auxiliary transistors TR2–TR5, although a greater number of auxiliary transistors may be used if greater output voltages are required.

Additional connections between the auxiliary transistors and the potentiometer means are provided in the form of connections to the emitters thereof, and redistribution of current takes place at these connections so that the currents are the same in sections at both ends of the potentiometer system. Said system comprises a plurality of potentiometers $R_2$, $R_3$, $R_4$ and $R_5$, $R_6$ such potentiometers being interleaved in such manner that each extends across the emitter-collector paths of two adjacent auxiliary transistors while providing a single base connection; this arrangement permits the emitter follower action to take place in all the auxiliary transistors, which action would not be possible if both their base electrodes and their emitters were connected to the same potentiometer.

Owing to the emitter-follower action the emitter potential closely follows the base potential, since the individual base electrodes of the auxiliary transistors are maintained substantially at potentials which are predetermined fractions of the total potential difference appearing across the series combination of emitter-collector paths as a whole, the emitter potentials follow likewise to give the required effect.

Since the primary transistor behaves substantially, at its collector, as a constant current device having a high internal impedance, and since the auxiliary transistors behave as low impedance devices at their emitters and high impedance devices at their collectors, the current flowing through the emitter-collector path of the primary transistor causes substantially the same current to flow into the emitter of the next adjacent auxiliary transistor, the collector of which then causes substantially the same current to flow into the emitter of the next transistor and so forth up to the load. Thus the load current is dictated almost entirely by the primary transistor.

As will be observed, in the circuit of FIGURE 4 there is no single potentiometer spanning the entire series combination of transistors when an even number of auxiliary transistors is employed. However, the resistances $R_2$ to $R_6$ constitute together the potentiometer means and such means, taken as a whole, are connected effectively in parallel with the series combination of transistors in such manner as to maintain the potential difference across the emitter-collector path of each transistor at a value which is about one fifth of any potential difference appearing across the said series combination.

Figure 5:
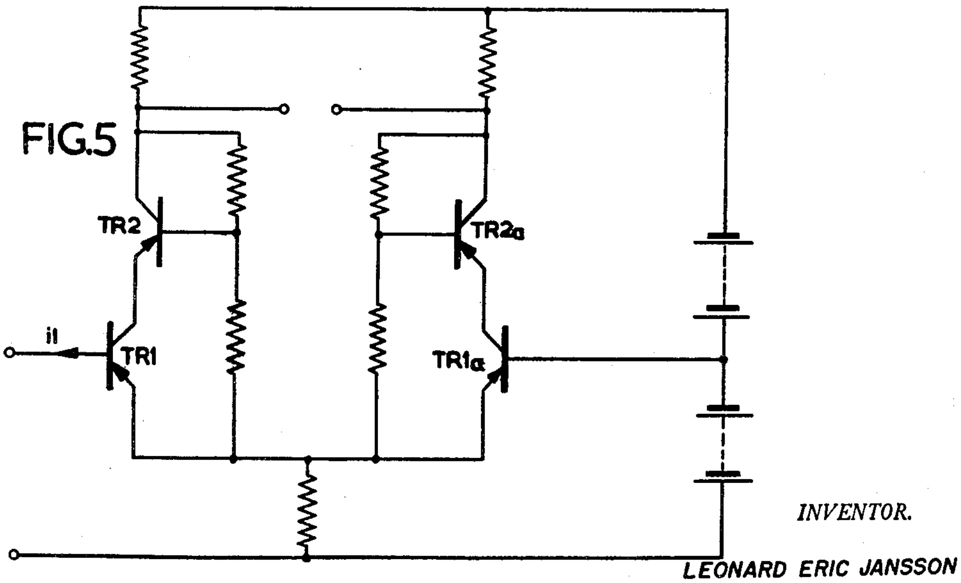
FIGURE 5 shows a "long tail pair" arrangement employing two circuits each of which is similar to the circuit of FIGURE 2.

Two circuits of the type shown in FIGURE 2 or FIGURE 4 can be connected in a conventional "long tail pair" circuit, to obtain an output voltage balanced with respect to ground. FIGURE 5 shows such an arrangement employing two circuits similar to the circuit of FIGURE 2.

Figure 6:
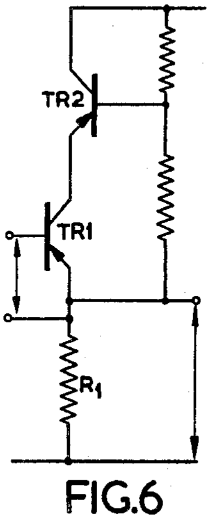
FIGURE 6 shows a circuit of the "boot-strap" type.

In the example of FIGURE 6 the load $R_1$ is placed at the opposite end of the transistor series combination as compared with the circuits of FIGURES 1 to 5. Consequently the circuit operates as a "boot-strap" circuit. TR1 is the primary transistor while TR2 is the auxiliary transistor, and a plurality of auxiliary transistors may be used if desired.

Referring to FIGURES 1 and 2, the value of resistance in the base lead of TR2 is equal to the resistance of $R_2$ and $R_3$ in parallel (assuming $R_2$ is appreciably greater than $R_1$). This resistance limits the base current that TR2 can take and increases the input resistance of TR2 at its emitter.

Figure 7:
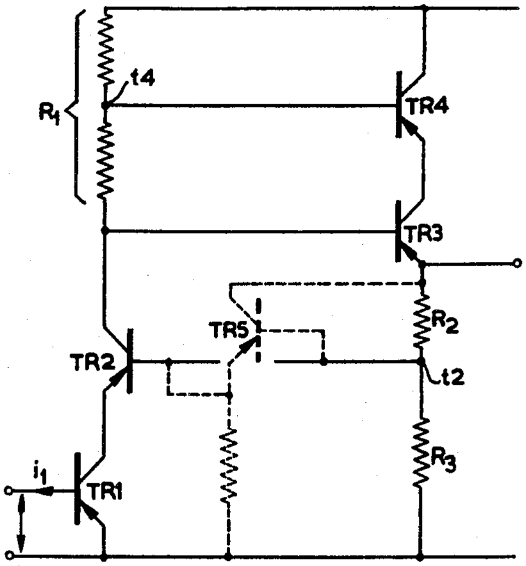
FIGURE 7 illustrates the use of an additional emitter-follower in the output circuit.

This resistance may be reduced by reducing the values of $R_2$ and $R_3$ and feeding them through an emitter follower TR3 as shown in FIGURE 7. In principle the collector of the emitter follower TR3 could be connected to the D.C. supply line at the top end of the load resistance $R_1$, and TR3 would act as one of the connections through which the potentiometer means are connected effectively in parallel with the series combination of transistors. However, if all the transistors used have substantially the same ratings, then excessive peak voltages are liable to occur across transistor TR3 since such voltages will be comparable with those appearing across the series combination of transistors TR1 and TR2. This problem can be solved by connecting the collector of TR3 to a tap on load $R_1$ or, as shown, by connecting the emitter-collector path of TR3 in series with that of a further transistor TR4 having its base connected to a tapping *t4* on the load. The resulting circuit arrangement may be regarded as employing, in effect, a circuit corresponding to that of FIGURE 2 in combination with a circuit similar to that of FIGURE 6.

If it is desired to reduce further the impedance in the base of TR2, the connection between its base electrode and the tapping *t2* may be effected through an additional emitter-follower transistor TR5 as shown in dotted lines.

Figure 8:
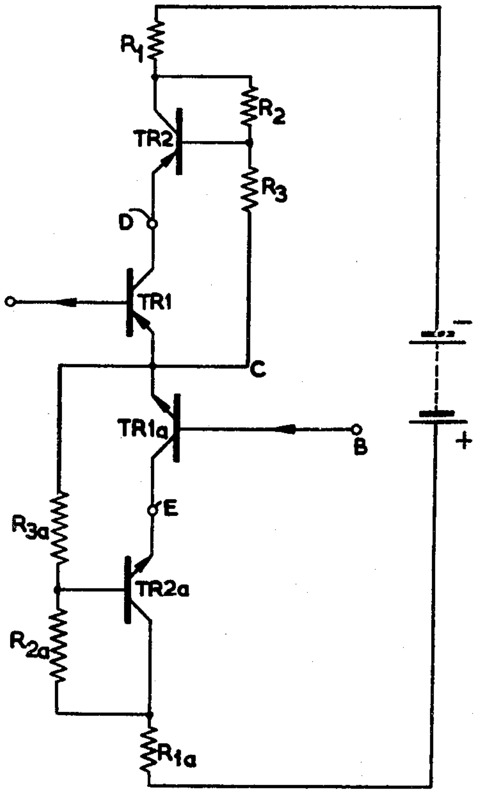
FIGURE 8 shows a circuit employing both p-n-p and n-p-n junction transistors.

The circuit of FIGURE 8 employs a symmetrical arrangement of n-p-n and p-n-p transistors for the purpose of providing a balanced amplified output. The circuit of transistors TR1, TR2 (with resistances $R_1$ to $R_3$) corresponds substantially to the circuit of FIGURE 2. The circuit of transistors TR1*a*, TR2*a* (with resistances $R_{1a}$ to $R_{3a}$) is a mirror image of the TR1—TR2 circuit obtained by using n-p-n transistors. This circuit arrangement can be used in various ways. The point C may be connected to a centre tap on the battery, in which case a balanced input drive voltage can be applied between points A and B. If, however point C is left unconnected and either point A or B is joined to the battery centre tap, the point C is held at the desired potential by emitter follower action. The input voltage can then be applied between points A and B.

An extension of this idea is to dispense with the battery centre tap and return either point A or point B to the centre of a potentiometer (not shown) connected across points D and E. This potentiometer would ensure that the voltages across the two centre transistors are substantially equal. The signal voltage would be applied between points A and B as before. Having thus isolated the input means from the battery centre tap, both loads $R_1$, $R_{1a}$ may be placed on one end of the chain and the earth may be connected to any point in the system.

What is claimed is:

1. A circuit arrangement comprising a plurality of transistors each having emitter, base and collector electrodes, a signal source connected between the emitter and base electrodes of the first transistor of said plurality, said emitter and base electrodes comprising input electrodes, a supply source, a load in series with said supply source, one terminal of the series combination of said load and supply source being connected to the collector of the last transistor of the remaining of said plurality, circuit means providing a direct current series connection from the collector of said first transistor across the emitter-collector paths of the remaining of said plurality to said one terminal of said series combination of said load and supply source, the other terminal of said series combination being connected to one of the input electrodes of said first transistor, a potentiometer system connected effectively in parallel between said terminals of the series combination, said potentiometer system comprising first and second potentiometers, one terminal of said first potentiometer being coupled through a resistor to said one terminal of the series combination, the other terminal of said first potentiometer being connected to the collector of said first transistor, one terminal of said second potentiometer being connected to the emitter of the last transistor of the remaining of said pluraliy, the other terminal of said second potentiometer being coupled through a resistor to said other terminal of said series combination, the base electrodes of said remaining transistors being alternately direct current conductively connected to spaced points on said first and second potentiometers, said first and second potentiometers being connected in parallel with each other through the base-emitter paths of said remaining transistors, whereby the voltage at the bases of all of said remaining transistors and the voltage drop across each transistor varies directly with the voltage produced across said load.

2. A circuit arrangement comprising a plurality of transistors each having emitter, base and collector electrodes, a signal source connected between the emitter and base electrodes of the first transistor of said plurality, said emitter and base electrodes comprising input electrodes, a supply source, a load in series with said supply source, one terminal of the series combination of said load and supply source being connected to the collector of the last transistor of the remaining of said plurality, circuit means providing a direct current series connection from the collector of said first transistor across the emitter-collector paths of the remaining of said plurality to said one terminal of said series combination of said load and supply source, the other terminal of said series combination being connected to one of the input electrodes of said first transistor, a potentiometer system connected effectively in parallel between said terminals of the series combination, said potentiometer system comprising first and second potentiometers, one terminal of said first potentiometer being coupled through a resistor to said one terminal of the series combination, the other terminal of said first potentiometer being connected to the collector of said first transistor, one terminal of said second potentiometer being connected to the emitter of the last transistor of the remaining of said plurality, the other terminal of said second potentiometer being coupled through a resistor to said other terminal of said series combination, the base electrodes of said remaining transistors being alternately direct current conductively connected to spaced points on said first and second potentiometers, the emitters of said remaining transistors being alternately direct current conductively connected to further spaced points on said first and second potentiometers, the base and emitter of a single transistor being connected to different potentiometers, whereby the voltage at the bases of all of said remaining transistors and the voltage drop across each transistor varies directly with the voltage produced across said load.

References Cited in the file of this patent

UNITED STATES PATENTS

| | | |
|---|---|---|
| 2,310,342 | Artzt | Feb. 9, 1943 |
| 2,764,643 | Sulzer | Sept. 25, 1956 |
| 2,794,076 | Shea | May 28, 1957 |
| 2,835,750 | Solkers et al. | May 20, 1958 |
| 2,888,525 | Eckess | May 16, 1959 |
| 2,926,307 | Ehret | Feb. 23, 1960 |